Oct. 19, 1937.  S. J. CARMODY  2,096,370
COOPERATIVE BIB COCK
Filed Oct. 23, 1936
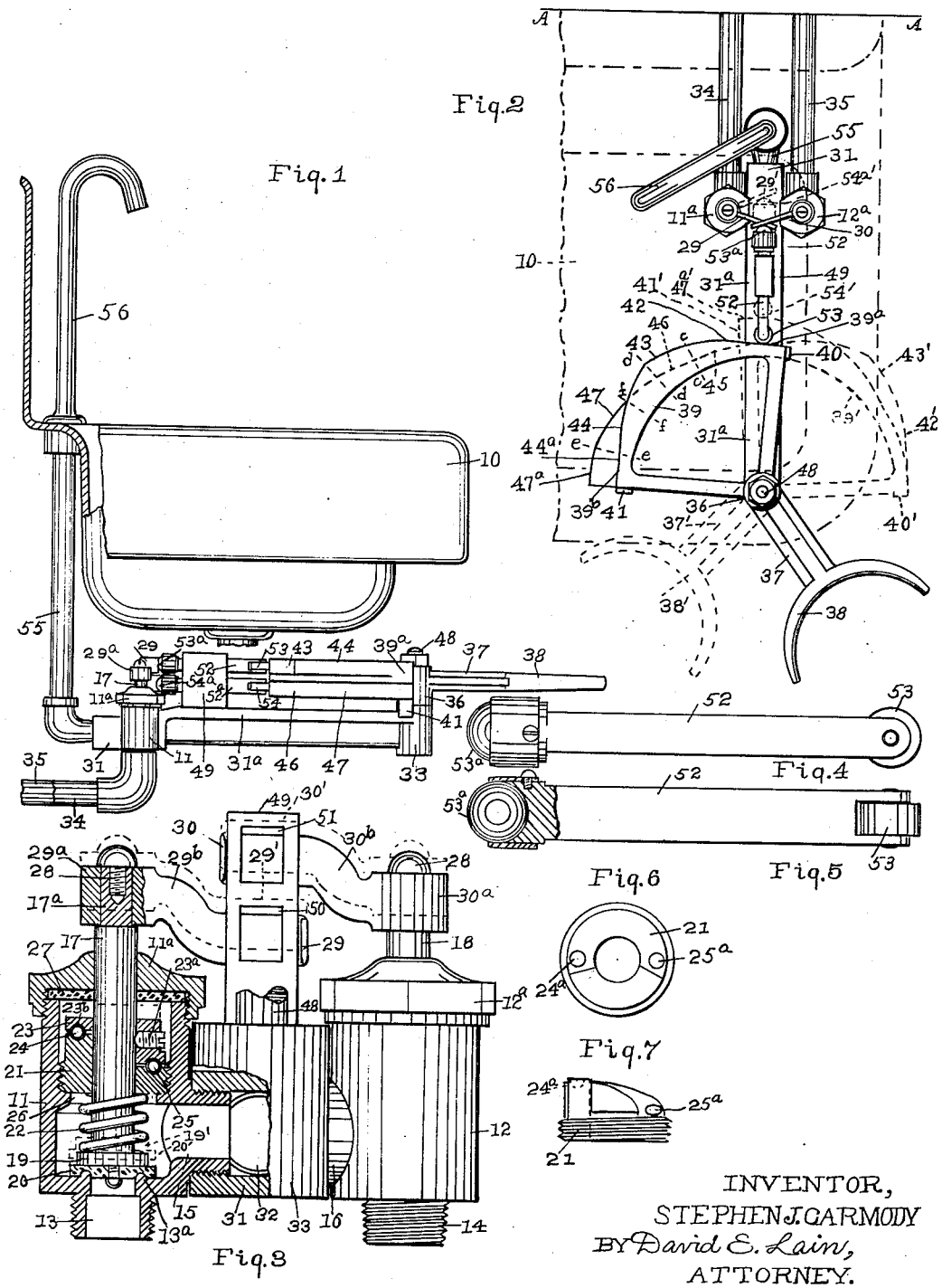
INVENTOR,
STEPHEN J. CARMODY
BY David E. Lain,
ATTORNEY.

Patented Oct. 19, 1937

2,096,370

UNITED STATES PATENT OFFICE 2,096,370

COOPERATIVE BIB-COCK

Stephen J. Carmody, Bellingham, Wash.

Application October 23, 1936, Serial No. 107,240

4 Claims. (Cl. 277—18)

My invention relates to improvements in cooperating bib-cocks, and is an improvement on an invention for which I was granted Patent Number 1,929,054 in which manually-operated cams are used to operate pressure bib-cocks; and has for an object to provide for cooperatively operating compression bib-cocks by cams, preferably, actuated by knee or leg pressure.

Other objects of my invention will appear as the description proceeds.

I attain these and other objects of my invention with the mechanism illustrated in the accompanying sheet of drawing, which forms a part of this specification, in which Figure 1 is a side elevation view of a wash-bowl to which my combined bib-cocks are attached; Fig. 2 is a plan view of Fig. 1 with the wash-bowl shown in broken lines; Fig. 3 is an end elevation of the joined hot and cold-water bib-cocks, shown in Figs. 1 and 2, with the operating cams removed drawn on a larger scale; Fig. 4 is a plan view of one of the two similar needles used with the operating mechanism, drawn on a larger scale; Fig. 5 is a side elevation of Fig. 4; Fig. 6 is a plan view of the ball-socket member, drawn on a larger scale, and Fig. 7 is a side elevation of Fig. 6.

Similar characters refer to similar parts throughout the drawing. Certain parts are broken away to show other parts hidden thereby.

With more particular reference to the designated parts: A wash-bowl 10 is held against the wall A—A in the usual way. A hot-water, compression bib-cock 11, is shown in cross-section on a vertical, medial plane, in Fig. 3 and has the inlet opening 13. A cold-water, compression bib-cock 12 has the inlet connection 14 and is exactly similar to the bib-cock 11 except that it is left-hand in operation while 11 is right-hand. The outlet of bib-cock 11 is shown at 15 while the outlet connection of the bib-cock 12 is shown at 16. Bib-cock 11 has the valve stem 17 and bib-cock 12 has the valve stem 18. The valve 19 is a flange on the lower end of the stem 17 and gasket 20 is between the valve 19 and the valve seat 13ª. The ball-socket member 21 is threaded on its lower end to engage with a thread on the interior of the cock 11 and seat on the annular boss 26 within the cock, and has the ball sockets 24ª, 25ª equidistant from its axis and on an inclined line through the said axis. Bearing balls 24 and 25 are seated in sockets 24ª and 25ª respectively. Helical ball-race member 23 is superposed on the ball-socket member 21 with balls 24 and 25 intervening and engaged in the helical ball race in member 23. Both members 21 and 23 have central aligned holes through which valve stem 17 is extended and set screw 23a, engaged in a radial threaded hole in member 23, is engaged with stem 17 to fasten the ball-race member thereon. Helical spring 22 is mounted on valve stem 17 to react between stationary ball-socket member 21 and flange valve 19 and tend to retain the valve gasket 20 on the seat 13ª. Cap 11ª has an internal thread which engages with an external thread on the upper end of cock 11 and covers the upper end of the cock with gasket 27 intervening to make a water-tight closure between the cock wall and the cap and between the cap and the valve stem 17.

The upper end of the valve stem 17 is of rectangular cross-section at 17ª and is extended through a rectangular hole in the handle hub 29ª of handle 29. The handle 29 is retained in place on the stem by screw 28 engaged in the stem 17. The handle 29 is first inclined downward from its hub at 29ᵇ and then extended at right angles with the stem for reasons to be subsequently explained. The handle 30 of the bib-cock 12 has the hub 30ª through which the squared end of the valve stem 18 is extended and is retained on the stem by screw 28 engaged in a tapped hole in the stem. The described manner of fastening the handles in place is the usual one. The handle 30 is first inclined upward at 30ᵇ and then extended at right angles with the stem 18 for reasons to be subsequently explained.

The mixing-chamber block 31 has oppositely disposed threaded holes into which the threaded outlets 15 and 16, of cocks 11 and 12, respectively, are engaged. The mixing chamber 32, within the block 31, communicates with the outlets of both of the cocks 11 and 12 and is extended rearward in the block where its interior-threaded outer end is engaged with a street elbow on the lower end of the union outlet pipe 55. Bracket 31ª is a continuation forward of the block 31 and has the bearing block 33 on its front end.

The hot-water supply pipe 34 connects with the inlet of cock 11 and is extended through the wall A—A to a source of hot water under pressure not shown. The cold-water supply pipe 35 is extended through the wall A—A to a source of cold water under pressure, not shown, and is connected with the inlet of the bib-cock 12.

The cam arm 37 is extended from one side of the cam hub 36 and terminates in the yoke 38 adapted for engaging the leg or knee of the operator. The cam frame consists of the hub 36 and the rim 39 joined by the spokes which extend from the hub opposite the cam arm 37. The cam hub 36 is mounted for oscillation on the stud 48 set in the bearing block 33, and bears on the top surface of the bearing block. This disposes the cam over the bracket 31ª and the lugs 40 and 41 on the ends of the cam rim project downward and bear on the sides of the bracket to limit the oscillations of the cam to an angle of about 75° as illustrated.

There are two cams disposed parallel with each other on the cam rim 39. The upper cam consists of the inclined plane surface 42, on the right-hand end of the rim, and the inclined plane surface 44ª, on the left-hand end of the rim, joined by the two intervening inclined arcuate cam surfaces 43 and 44. The lower cam consists of the arcuate surface 45, on the right-hand end of the rim, the arcuate surface 47ª on the left-hand end of the rim and the intervening connecting inclined arcuate surface 46, 47. The arcuate cam surface 45 has a shorter radius than has the arcuate cam surface 47ª and both are concentric with the cam rim axis.

The post 49 is disposed on the top surface of the bracket 31ª, adjacent the bib-cocks, and has the upper rectangular hole 51 and the lower rectangular hole 50 extended through the same, parallel with the said bracket. There are two similar needles 52 and 52ª extended through the holes 51 and 50 respectively. Needle 52 has the wheel 53 mounted for revolution on its front end and the ball 53ª mounted for revolution on its rear end. Needle 52ª has the wheel 54 mounted for revolution on its front end and the ball 54ª mounted for revolution on its rear end. The needles are inserted in the holes 50 and 51 prior to mounting the wheels 53 and 54 thereon. The distance between wheel 53 and ball 53ª provides that wheel 53 may bear on the cam arc 39ª while the ball 53ª bears on the valve stem handle 30 when the valve is fully closed, and that wheel 54 may bear on the cam arc 39ª while the ball 54ª bears on the valve stem handle 29 when the valve 19, 20 is fully closed. The hot and cold-water outlet pipe 55 connects the mixing chamber 32 with hot and cold-water outlet spout 56.

When the hot-water bib-cock 11 has its handle 29 turned in a counter-clockwise direction, from its position shown in solid lines in Fig. 2, to its dotted-line position at 29' in Fig. 2 the left-hand, helical, ball-race element 23, moving over the balls 24 and 25 in a counter-clockwise direction, will force the valve stem 17 and its valve 19, 20 upward off of the valve seat 13ª, against the reaction of the spring 22, and fully open the valve for the flow of water through the same into the mixing chamber 32 and into the bowl 10 from the spout 56. When the said turning pressure is released from the handle 29 the spring 22 will tend to react to turn the helical, ball-race element 23 in a clockwise direction to close the valve against the passage of water. Similarly, when the cold-water bib-cock 12 has its handle 30 turned in a clockwise direction, from its position shown in solid lines in Fig. 3, to its dotted-line position at 30' the right-hand, helical ball-race therein, not shown, will be forced upward on balls therein, not shown, against the reaction of the spring therein, not shown, and move the valve stem 18 and handle 30, thereon, upward to the dotted line position at 30', shown in Fig. 3, thus opening the valve in the bib-cock 12 to allow cold water to flow into the mixing chamber 32 to the full capacity of the cock, and on release of the turning pressure on the handle 30 the reaction of the spring within the cock 12 will tend to reseat the valve therein and stop the flow of water through the same.

In the illustrated assembled structure, most clearly shown in Fig. 2, the operative parts, when the bib-cock valves are both closed, are shown in solid lines. The cam is in an extreme position in oscillation with its stop 40 bearing on the bracket 31ª and the cam handle and crotch in their extreme right-hand positions. The needle 52 and wheel and ball thereon are disposed above the needle 52ª and the wheel and ball thereon and conceal the same. The wheels 53 and 54 bear on the sector 39ª while the balls 53ª and 54ª bear on the stem handles 30 and 29 respectively. When the cam has been oscillated till its stop 41 bears on the bracket 31ª its position is shown in dotted lines in Fig. 2 with the said stop at 41', the cam handle and crotch at 37' and 38', respectively, the cam rim at 39', longer-radius sector 47ª at 47ª', the cam parts 42 and 43 at 42' and 43', respectively, and the cam stop 40 at 40'. In the dotted-line position of the cam, the wheel 53 bears on the sector 39ᵇ, which is of equal radius with the sector 39ª, and the ball 53ª allows the stem handle 39 to be at its closed position; but the wheel 54 bears on the long-radius sector 47ª, now at 47ª', which has moved it to its position at 54', while the ball 54ª is disposed at 54ª'. This disposition of the ball 54ª forces the stem handle 29 to its dotted-line position at 29' and the hot-water cock 11 is held in a fully open position with the flange 19 and gasket 20 at 19' and 20' respectively.

Now return the cam to its solid-line position and again oscillate it in a clockwise direction: The inclined-plane cam surface 42, on the upper or cold-water cam, will pass beneath the wheel 53 and force it, the ball 53ª and the stem handle 30 rearward and raise the valve of the cold-water cock 12 off of its seat and allow a small stream of cold water to flow from the spout 56. Continuing cam oscillation, the inclined plane surface 42 moves farther under the wheel 53, forcing the stem handle 30 farther rearward and increasing the valve opening and volume of cold water, till the inclined arcuate cam surface 43 reaches the wheel. The inclined plane surface 42 is useful in that it provides for a slow opening of the valve while the pressure of water against the spring is exerted on the minimum valve area and is of minimum force, but its farther extension might provide the spring with sufficient moment arm to move the cam when manual turning force ceased to act. During the inward passage of the cam surface 43 beneath the wheel 53, the valve of cock 12 continues to move farther from its seat and an increasing volume of cold water continues to flow from the spout 56, till the outer end of surface 43, at the line d—d, is reached, when the extreme eccentricity of the upper cam is beneath the wheel and the valve of the cold-water cock 12 is farthest above its seat providing for the maximum flow of cold water. Continuing the stated cam oscillation, the outer end of the inclined arcuate cam surface 44 passes beneath the wheel 53 and the reaction of the valve spring is depended upon to force the stem handle 30 against the ball 53ª and maintain the wheel 53 in contact with the cam as the valve is being closed by the said tendency of the spring to react. Continued clockwise cam movement causes the entire length of the cam-part 44 to pass beneath the wheel, when the outer end of the inclined plane 44ª passes beneath the wheel and the valve of the cock 12 is nearly closed, allowing but a small flow of cold water to pass through the cock. A continuation of the same cam movement brings the lower end of the cam-part 44ª beneath the wheel 53 when the short-radius, arcuate cam surface 39ᵇ passes beneath the wheel and the cold-water cock 12 is closed.

During the described complete oscillation of the cam in a clockwise direction, with respect to its effect on the flow of cold water, no mention was made of those parts of the said cam movement effective in permitting the flow of hot water. When the part of the cold-water cam marked c—c contacted the wheel 53 the inner end of the inclined-plane cam part 46 contacted the wheel 54 and, as the cam moved, the valve 19, 20 was lifted from its seat 13ª and a small flow of hot water passed into the chamber 32 to mix with the large flow of cold water and increases its temperature as it passed from the spout 56. Continued cam movement brought the inclined arcuate cam surface 47 in contact with wheel 54 and the hot-water valve continued to increase its opening and the flow of hot water increased and the volume and temperature of water passing from the spout increased. On reaching the point indicated by the line d—d, where the full volume of cold water was released, the hot-water cam surface 47 had lifted the valve 19—20 sufficiently to allow a large part of the full volume of hot water to pass, for reasons above explained. Further clockwise movement of the cam provides for increased volume of hot water and decreasing volume of cold water till the point indicated at f—f is reached when the cold and hot-water valve openings are equal and equal volumes of cold and hot water enter the mixing chamber and flow from the spout 56 at a temperature dependent on the relative temperatures thereof. Continued cam movement moves the more eccentric parts of the cam part 47 to contact the wheel 54 to increase the hot-water valve opening till the most eccentric part thereof bears on the wheel when the valve 19, 20 is thus held fully open, and remains open with only hot water pouring from the spout 56 and the bib-cock 12 remains closed.

By oscillating the cam from its dotted-line position to its solid line position, shown in Fig. 2, the same proportionate quantities of hot and cold water and resultant temperatures are obtainable in reverse order.

By using a cam with a longer rim and cam surfaces they may be made with smaller gradients than this reduction to practice discloses. Other desired relations and combinations of hot and cold water are obtainable by designing the cams to suit.

The cam surfaces are designed to provide stability for the cam, it being desired that the cam may remain stationary under pressure from the valve springs in whatever part of its oscillation it may be.

Although this reduction to practice discloses means for mixing and delivering hot and cold water, the disclosed mechanism is suitable for handling other fluids.

Having thus disclosed my invention, what I claim as new therein and desire to secure by Letters Patent is,—

1. Mechanism of the kind described including, two compression bib-cocks disposed in parallel relation, a valve and a valve stem fastened thereon mounted in each of the said bib-cocks for helical oscillation on its axis, two springs each mounted in one of the said bib-cocks for reaction between a stationary part of the said bib-cock and the said valve therein tending to seat the said valve by oscillating the said valve stem helically in one direction, an arm fastened on each of the said valve stems, two cams mounted for oscillation on an axis parallel with the axes of the said valve stems, and two needles independently mounted for reciprocation between the said cams and the said stem arms to independently convey operative pressure from each of the said cams to each of the arms and oscillate each of the said arms independently helically to independently open each of he said valves when each of the said cams independently approaches each of the said stems.

2. Mechanism of the kind described including, two compression bib-cocks disposed in parallel relation, a valve and a valve stem fastened thereon mounted in each of the said bib-cocks for helical oscillation on the axis of the said stem, two springs each mounted in one of the said bib-cocks for reaction between a stationary part of the bib-cock and the said valve therein tending to seat the said valve by oscillating the valve stem helically in one direction, an arm fastened on each of the said valve stems, two cams mounted for oscillation on an axis parallel with the axes of the valve stems, two needles independently mounted for reciprocation between the said cams and the said stem arms to independently convey pressure from each of the said cams to each of the said stem arms and oscillate each of the said stems independently helically in the other direction to open each of the said valves as each of the cams approach each of the said valve stems, and friction-reducing means on each end of each of the said needles.

3. Mechanism of the kind described including, a mixing-chamber block, two compression bib-cocks disposed in parallel relation on opposite sides of the said mixing-chamber block, a fluid mixing chamber within the said block, means to connect the outlets of the said bib-cocks with the said mixing chamber, a valve and a valve stem fastened thereon mounted in each of the said bib-cocks operable by helical oscillation on the axis of the valve stem, two springs each mounted in one of the said bib-cocks to react between a stationary part of the bib-cock and the said valve tending to seat the valve by oscillating the valve stem helically in one direction, an arm fastened on each of the said valve stems, two cams mounted in staggered relation for oscillation on an axis parallel with the axes of the said valve stems, and a needle mounted in bearings for reciprocation between each of the said cams and each of the said stem arms to simultaneously bear on the said cam and the said arm and independently oscillate each of the said stems helically in the other direction and open the said valve thereon when one of the said cams approaches the said stem.

4. Mechanism of the kind described including, a mixing-chamber block, two compression bib-cocks disposed in parallel relation on opposite sides of the said mixing-chamber block, a fluid mixing chamber within the said block, means to connect the outlets of the said bib-cocks with the said fluid mixing chamber, a valve and a valve stem fastened thereon mounted in each of the said bib-cocks operable by helical oscillations on the axis of the valve stem, two springs one mounted in each of the said bib-cocks to react between a stationary part of the bib-cock and the said valve tending to seat the valve by oscillating the valve stem thereon helically in one direction, an arm fastened on each of the valve stems, a bracket fastened on the said mixing-chamber block, a cam frame mounted for oscillation on the said bracket on an axis parallel with the axes of the said valve stems, two separate, staggered, cams fastened on the said cam frame, means between each of the said cams and each of the said stem arms to separately oscillate each of the said stems helically in the other direction and open the said valve thereon when one of the said cams approaches the stem of the said valve, and an arm terminating in a crotch fastened on the said cam frame.

STEPHEN J. CARMODY.